United States Patent
Sugiyama

(10) Patent No.: US 8,818,168 B2
(45) Date of Patent: Aug. 26, 2014

(54) IMAGE CAPTURE APPARATUS, RECORD/PLAYBACK DEVICE, AND MENU-OPERATING METHOD

(75) Inventor: Akira Sugiyama, Kanagawa (JP)

(73) Assignee: Sony Corporation, Tokyo (JP)

(*) Notice: Subject to any disclaimer, the term of this patent is extended or adjusted under 35 U.S.C. 154(b) by 1008 days.

(21) Appl. No.: 12/045,826

(22) Filed: Mar. 11, 2008

(65) Prior Publication Data
US 2008/0226254 A1    Sep. 18, 2008

(30) Foreign Application Priority Data
Mar. 14, 2007 (JP) ................ P2007-065301

(51) Int. Cl.
H04N 9/80 (2006.01)

(52) U.S. Cl.
USPC .................. 386/243; 386/278; 386/248

(58) Field of Classification Search
USPC ................. 715/700; 386/278, 243, 248
See application file for complete search history.

(56) References Cited

U.S. PATENT DOCUMENTS

| | | | |
|---|---|---|---|
| 6,282,362 B1* | 8/2001 | Murphy et al. ........... | 386/224 |
| 2005/0268521 A1* | 12/2005 | Cox et al. ................ | 42/130 |
| 2006/0008247 A1* | 1/2006 | Minami et al. .......... | 386/52 |
| 2007/0081812 A1* | 4/2007 | Ikehata et al. .......... | 396/287 |
| 2007/0150453 A1* | 6/2007 | Morita ...................... | 707/3 |
| 2007/0189708 A1* | 8/2007 | Lerman et al. .......... | 386/52 |
| 2009/0034931 A1* | 2/2009 | Stone et al. ............. | 386/52 |

FOREIGN PATENT DOCUMENTS

| | | |
|---|---|---|
| JP | 2001 197426 | 7/2001 |
| JP | 2004 165806 | 6/2004 |
| JP | 2004 274500 | 9/2004 |
| JP | 2005 260798 | 9/2005 |

* cited by examiner

*Primary Examiner* — Philip Chea
*Assistant Examiner* — Kendall Dolly
(74) *Attorney, Agent, or Firm* — Frommer Lawrence & Haug LLP; William S. Frommer

(57) ABSTRACT

A record/playback device includes a recording unit, an operation unit, an interface unit, and a control unit. The recording unit is configured to record an image including one or more frames as one clip and play back a recorded image. The operation unit is configured to have a combined operating element including a first operating element and a second operating element. The interface unit is configured to prepare a list of clips by collecting specific frames for a predetermined number of clips. The control unit is configured to carry out control of changing a clip operated on the basis of the operation direction of the first operating element and to prepare a menu-displaying command signal to display a menu on which items for operating the clip are described when the second operating element is operated.

7 Claims, 10 Drawing Sheets

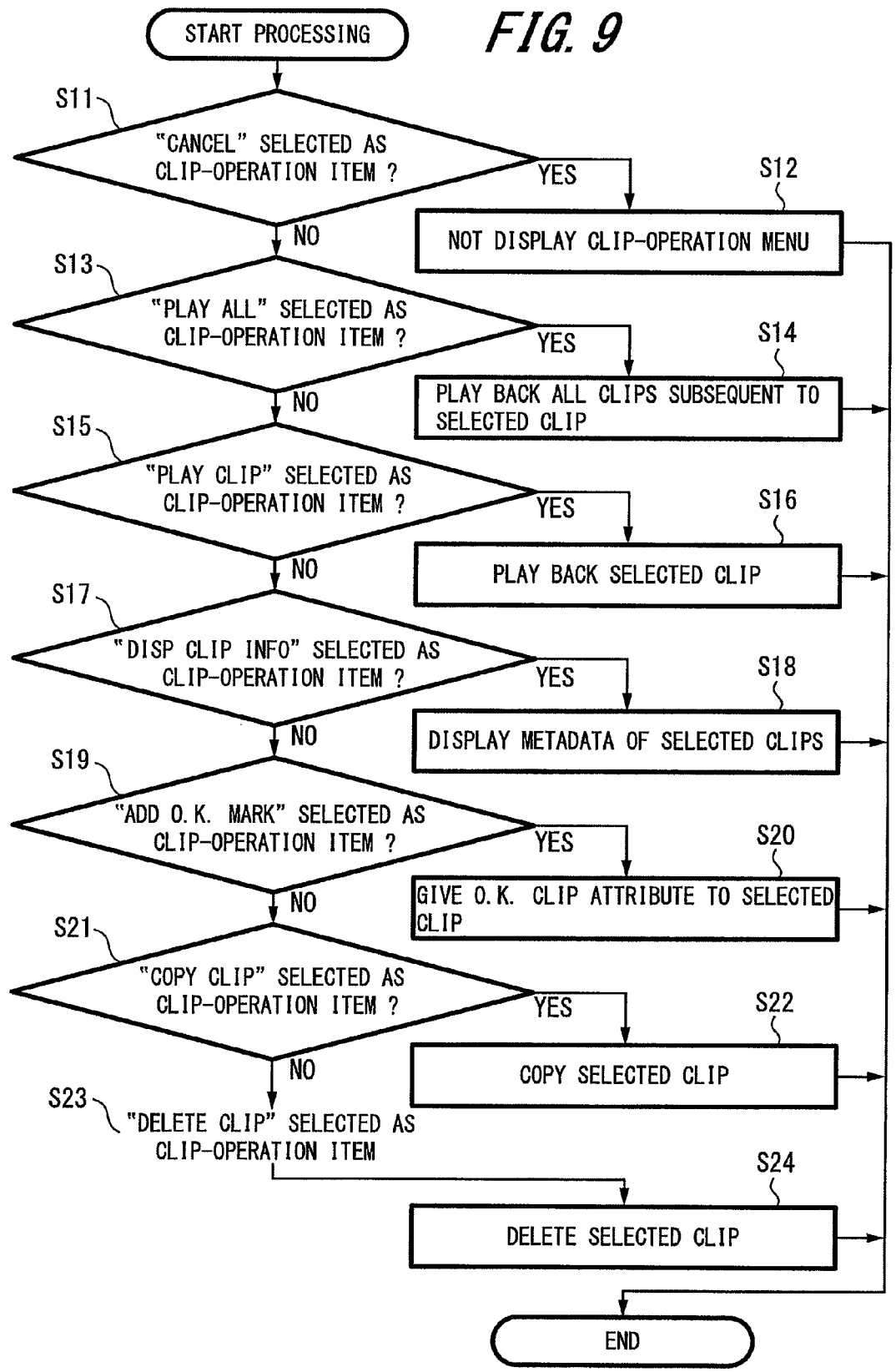

IMAGE CAPTURE APPARATUS, RECORD/PLAYBACK DEVICE, AND MENU-OPERATING METHOD

CROSS REFERENCES TO RELATED APPLICATIONS

The present invention contains subject matter related to Japanese Patent Application JP 2007-065301 filed in the Japanese Patent Office on Mar. 14, 2007, the entire contents of which being incorporated herein by reference.

BACKGROUND OF THE INVENTION

1. Field of the Invention

The invention relates to an image capture apparatus and a record/playback device favorably applied to a camera-integrated record/playback device provided with, for example, a cross-like operation key, and a menu-operating method applied to the image capture apparatus and the record/playback device.

2. Description of the Related Art

In recent years, a record/playback device in which an imaging unit and a recording unit are integrated with each other has been increasingly used in shooting programs to be broadcast on TV. In the record/playback device, an image captured with the imaging unit is recorded as a video signal in a recording unit. Instructions to start and end the recording and so on are carried out through an operation unit having buttons or the like provided on a body of the record/playback device. A video signal obtained during a period from the instruction to start the recording to the instruction to end the recording is recorded as one file called a clip. In other words, if the operation of starting and ending the recording is carried out two or more times, then two or more clips can be recorded in the recording unit.

A removable external recording medium that can be detachably mounted on the body of the record/playback device has been used as a recording unit in many cases. In recent years, the data-storage capacity of the external recording medium is increased. Thus, the number of clips recorded in the recording unit tends to increase greatly. An editing task such as deleting and selecting clips may be required to broadcast the recorded clips as a program of television broadcasting. However, it may take much time to select a desired clip from a large number of clips recorded in the recording unit.

Therefore, images of leading frames of the respective clips are reduced when the editing is carried and the reduced images are then displayed as a list of thumbnail images. Such a display allows the user to find the desired clip to be edited quickly when performing an editing task, so that the working efficiency can be improved.

Japanese Unexamined Patent Application Publication No. 2001-197426 discloses that video data is edited using thumbnail images.

SUMMARY OF THE INVENTION

An operation interface, such as a cross key, is often used for searching or selecting a desired clip from a list of thumbnail images as described above. The cross key is formed so that it can be pushed down in each of the left, right, up, and down directions. A cursor or a selection frame on the display screen can be moved in a desired direction by pushing the cross key down in any of the left, right, up, and down directions.

FIG. 1 illustrates an exemplified configuration of a cross key 10. As shown in FIG. 1, directions in which the key can be pushed down are shown as XU, XR, XD, and XL in the clockwise direction from the top. If the cross key KY10 is pushed down in the XU direction, then the cursor or the selection frame on the display screen moves upward. Similarly, if it is pushed down in the XR direction, then the rightward movement occurs. If it is pushed down in the XD direction, then the downward movement occurs. If it is pushed down in the XL direction, then the leftward movement occurs. The area of XA marked on the center of the cross key KY10 indicates that the key is operated in the push-in direction. In addition, a menu button BN20 is arranged on the right side of the cross key KY10. Thus, a clip-operation menu can be actuated by pushing down the menu button BN20. The clip-operation menu represents a list of actions, such as "PLAY CLIP (playback)" and "DELETE CLIP (deletion), corresponding to the selected clip.

FIG. 2 illustrates an example of processing from the selection of a desired clip to the determination of an action, such as "playback" or "deletion", of the selected clip by operating such a cross key. In the following description, these actions will be referred to as clip-operation items. As shown in FIG. 2, an operation button (not shown) is first pushed down or the like to indicate a display of a list of thumbnail images. Then, the list of thumbnail images is displayed on a display unit (not shown) of a record/playback device (Step S51). In the following description, a screen on which the list of thumbnail images is displayed is referred to as a thumbnail screen.

Subsequently, the cross key KY10 is operated in any of the left, right, up, and down directions to move a thumbnail-image selection frame, thereby selecting a clip to be operated (Step S52). Then, a menu button BN20 is pushed down to initiate a clip-operation menu (Step S53). In the clip-operation menu, clip-operation items are displayed in line in the vertical direction.

After selecting a clip-operation item from the displayed clip-operation items by operating the cross key KY10 in the up and down directions (Step S54), the operation of pushing in the XA of the cross key KY10 is carried out (Step S55). If the selected item is, for example, "PLAY CLIP", then the selected clip is played back. In contrast, if it is "DELETE", then the selected clip is removed from the recording unit.

As described above, a plurality of clips are displayed as thumbnail images and the selection of a clip is then carried out by operating the cross key KY10, thereby allowing the edit task to be smoothly performed. However, the operation of the menu button BN20 may also be required in addition to the operation of the cross key KY10 when selecting clip-operation items. Thus, it may take time. Therefore, more speedy operation procedures, which allow the above operation to be carried out in series, have been desired.

It is desirable to carry out a series of operations from the selection of a clip to the determination of a clip-operation item without taking time.

According to an embodiment of the invention, there is provided a record/playback device including a recording unit for recording images captured within a period from the start to the end of shooting. According to another embodiment of the invention there is provided an image capture apparatus including such a record/playback device. The device and apparatus each have an operation unit including an operation element in which first and second operating elements are combined. The first operating element is provided for carrying out operation in one or more operation directions. The second operating element is provided for determining details of the operation. In addition, an interface unit is provided for preparing a list of clips by collecting specific frames. Here, the specific frames correspond to a predetermined number of clips. Each specific frame is selected from a plurality of frames that constitute each clip recorded in the recording unit. Furthermore, the control of changing a clip to be operated is carried out on the basis of the operation direction of the first operating element when the first operating element is operated in a state in which the list of clips prepared at the interface unit is displayed. In addition, a menu-displaying command signal to display a menu on which items for operating the clip are described is prepared when the second operating element is operated in the state in which the list of clips prepared at the interface unit is displayed.

Consequently, the selection of a clip to be operated and the determination of an operation item for the clip can be carried out by only operating a single operating element.

According to the embodiments of the invention, the selection of a clip to be operated and the determination of an operation item for the clip can be carried out by operating a single operating element alone. Therefore, efficiency of such operation can be improved.

BRIEF DESCRIPTION OF THE DRAWINGS

FIGS. 7B and 7D illustrate the operation of the cross key and FIGS. 7A, 7C and 7E illustrate the configurations of displayed screens, respectively.

FIGS. 8A and 8C illustrate the operation of the cross key and FIGS. 8B, and 8D illustrate the configurations of displayed screens, respectively.

FIG. 9 is a flowchart representing a process example of clip operation according to an embodiment of the invention.

DESCRIPTION OF THE PREFERRED EMBODIMENTS

Figure 3:
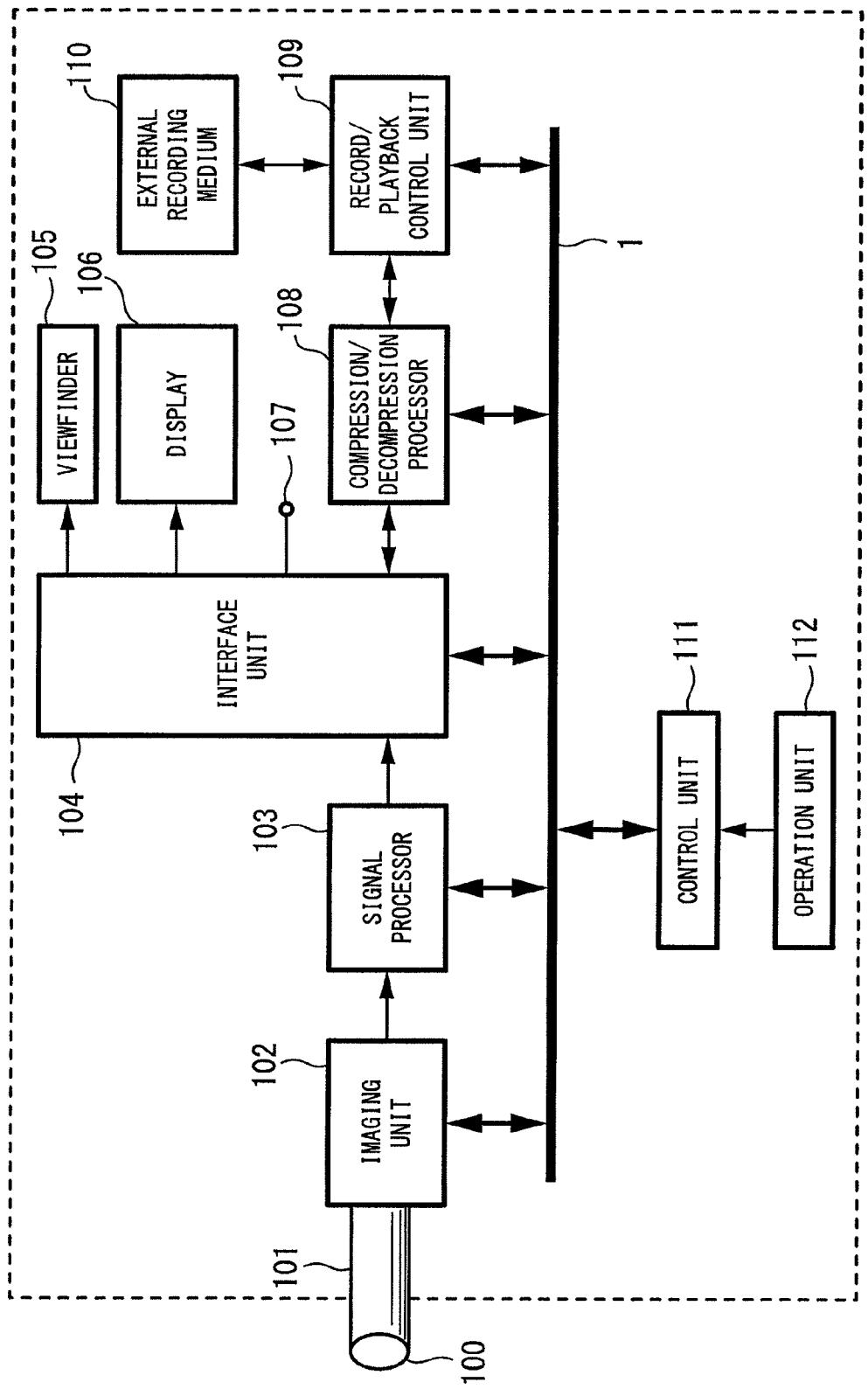
FIG. 3 is a block diagram of an exemplified internal configuration of a record/playback device according to an embodiment of the invention.

Hereinafter, an embodiment of the invention will be described with reference to FIGS. 3 to 9. FIG. 3 is a block diagram of an exemplified internal configuration of a record/playback device with a built-in camera according to an embodiment of the invention. The record/playback device 10 illustrated in FIG. 3 includes a lens block 101 and an imaging unit 102. The lens block 101 includes a lens group including a lens 100. The imaging unit 102 photoelectrically converts a lens 100. The imaging unit 102 photoelectrically converts light forming an image of a subject through the lens group of the lens block 101 to be output as a video signal. The imaging unit 102 includes an analog/digital converter (hereinafter, referred to as an A/D converter) (not shown). Subsequent to the imaging unit 102, there is provided a signal processor 103 that performs a digital-signal processing on the digital video signal output from the A/D converter.

The signal processor 103 performs knee correction that compresses a video signal of more than a certain luminance level and gamma correction which corrects the level of the video signal according to a predetermined gamma curve. In addition, the signal processor 103 performs white-clip processing or black-clip processing of restricting the signal level of the video signal within a predetermined level, and so on.

The imaging unit 102 and the signal processor 103 carry out imaging and processing under the control of a control unit 111, respectively. The control unit 111 is a central control unit including a central processing unit (CPU) and so on. The control unit 111 controls not only the imaging unit 102 and the signal processor 103 but also each of other units of the record/playback device 10 connected through a transmission line 1. Upon an input operation using an operation unit 112 connected to the control unit 111, the control unit 111 controls each unit. The operation unit 112 may include various buttons, a later-described cross key, and so on.

The video signal subjected to digital-signal processing in the signal processor 103 is transmitted to an interface unit 104 that transmits and receives data between the respective units. The intermediate unit is connected to a viewfinder 105, a display 106, an external output terminal 107, and a compression/decompression processor 108. The viewfinder 105 allows the user to determine the composition of an image, adjust a focus, and so on. The display 106 displays images being captured with the imaging unit 102 or reproduced video that has been recorded in a later-described external recording medium. The external output terminal 107 is a terminal to be connected to an external video display or the like. The compression/decompression processor 108 performs compression or decompression on video signals. Furthermore, the compression/decompression processor 108 is connected to a record/playback control unit 109 through which an external recording medium 110 can be connected.

The viewfinder 105 and the display 106 may display a later-described list of thumbnail images, metadata (i.e., video attribute information), and so on in addition to captured images.

The compression/decompression processor 108 performs compression-processing of a video signal captured with the imaging unit 102 according to a predetermined standard, such as MPEG (Moving Picture Experts Group) standard. Data compressed at the compression/decompression processor 108 is transmitted to the external recording medium 110 through the record/playback control unit 109 and then recorded in the external recording medium 110. Video data is recorded in the external recording medium 110 as clips and also metadata such as the recorded length and recording date of the clip is recorded. The compression/decompression processor 108 also performs decompression-processing of the compressed video data recorded in the external recording medium 110. The decompressed video data is then transmitted to the interface unit 104.

In addition, when the display of a thumbnail screen is indicated via the operation unit 112, the compression/decompression processor 108 performs decompression-processing by sequentially reading clips recorded in the external recording medium 110 on the basis of menu-display control signals output from the control unit 111 and also carries out processing of outputting the leading frame of each clip as a still image to the interface unit 104. If the number of clips displayed on the thumbnail screen is, for example, 12, then 12 still images are transmitted to the interface unit 104.

The interface unit 104 performs the processing of transmitting and receiving data between the respective units. In addition, the interface unit 104 reduces the size of a still image of the leading frame of each clip received from the compression/decompression processor 108 and then prepares, for example, 12 thumbnail images, followed by aligning them in chronological order from old to new. Furthermore, the interface unit 104 performs processing of making the link between the respective thumbnail images and their corresponding metadata.

The record/playback control unit 109 performs the processing of writing (recording) video data compressed according to a predetermined format at the compression/decompression processor 108 into the external recording medium 110. In addition, the record/playback control unit 109 performs the control of reading and playing back the video data recorded in the external recording medium 110.

Figure 1:
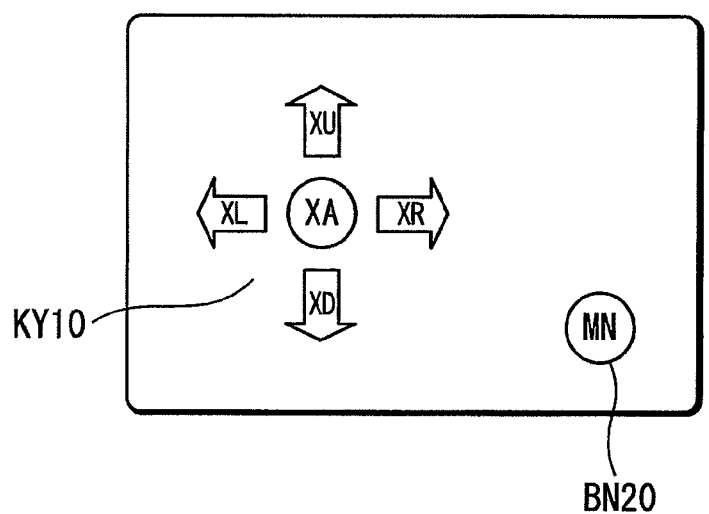
FIG. 1 is a schematic diagram of an exemplified configuration of a related-art cross key.
Figure 2:
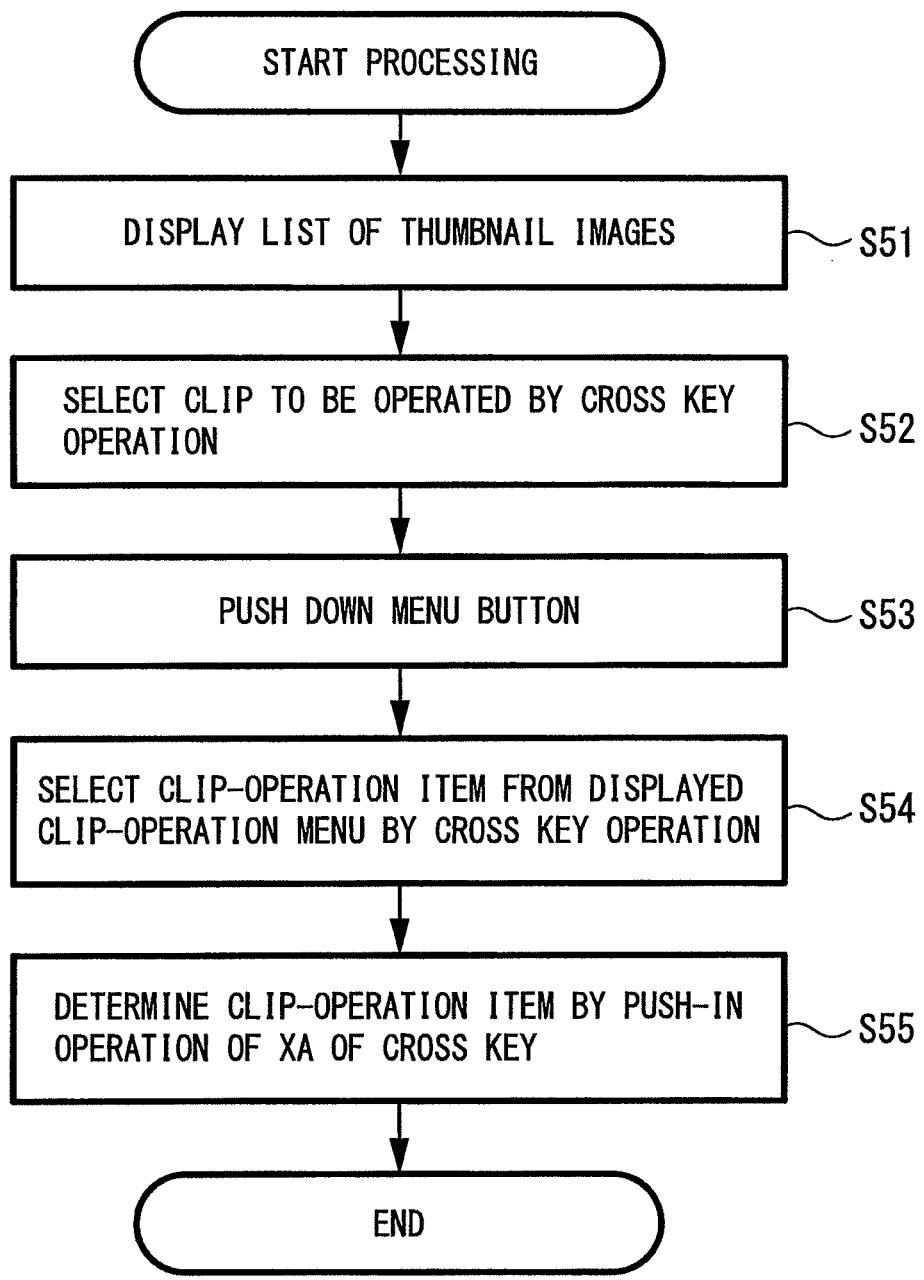
FIG. 2 is a flowchart representing a related-art process example of selecting a clip-operation item.
Figure 4:
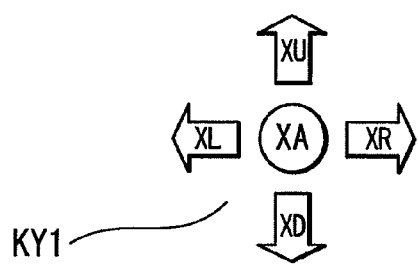
FIG. 4 is a schematic diagram of an exemplified configuration of a cross key according to an embodiment of the invention.

Referring to FIG. 4, an exemplified configuration of a cross key KY1 used in the record/playback device 10 according to the embodiment will be described. The configuration of the cross key KY1 is the same as that of the cross key used in the related-art device as described above with reference to FIG. 1. In other words, it can be pushed down in the up direction XU, right direction XR, down direction XD, and left direction XL. In addition, the portion XA of the cross key KY1 can be operated in the push-in direction. In this embodiment, an operating element operable in the respective directions of XU, XR, XD, and XL is referred to as a first operating element and the operating element represented by XA is referred to as a second operating element.

A process example for carrying out a clip-operation task with the cross key KY1 will be described with reference to FIG. 5.

Figure 5:
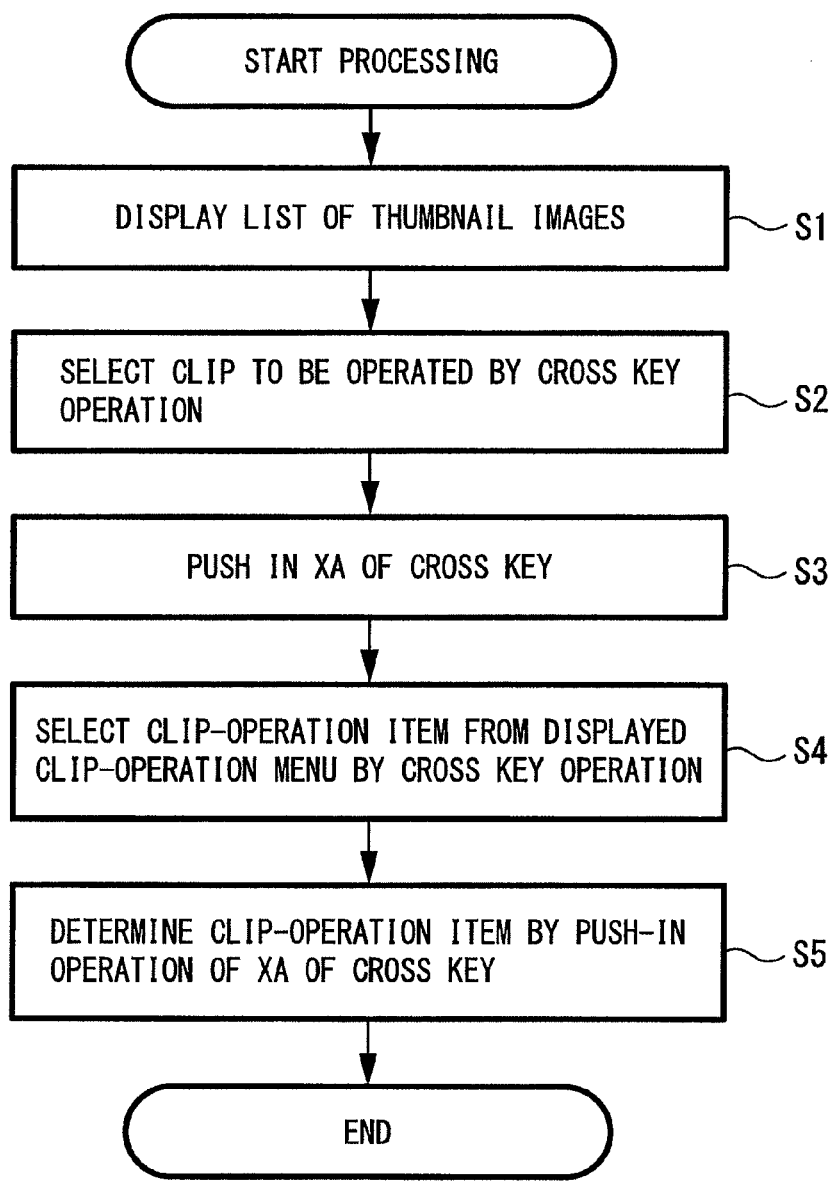
FIG. 5 is a flowchart of a process example of selecting a clip-operation item according to an embodiment of the invention.

As indicated in FIG. 5, first, when an operation button (not shown) is pushed down or operated in some way to indicate the display of a list of thumbnail images, the list of thumbnail images is displayed on the view finder 105 and the display 106 of the record/playback device 10 (Step S1). Here, the thumbnail screen is described with reference to FIG. 6.

Figure 6:
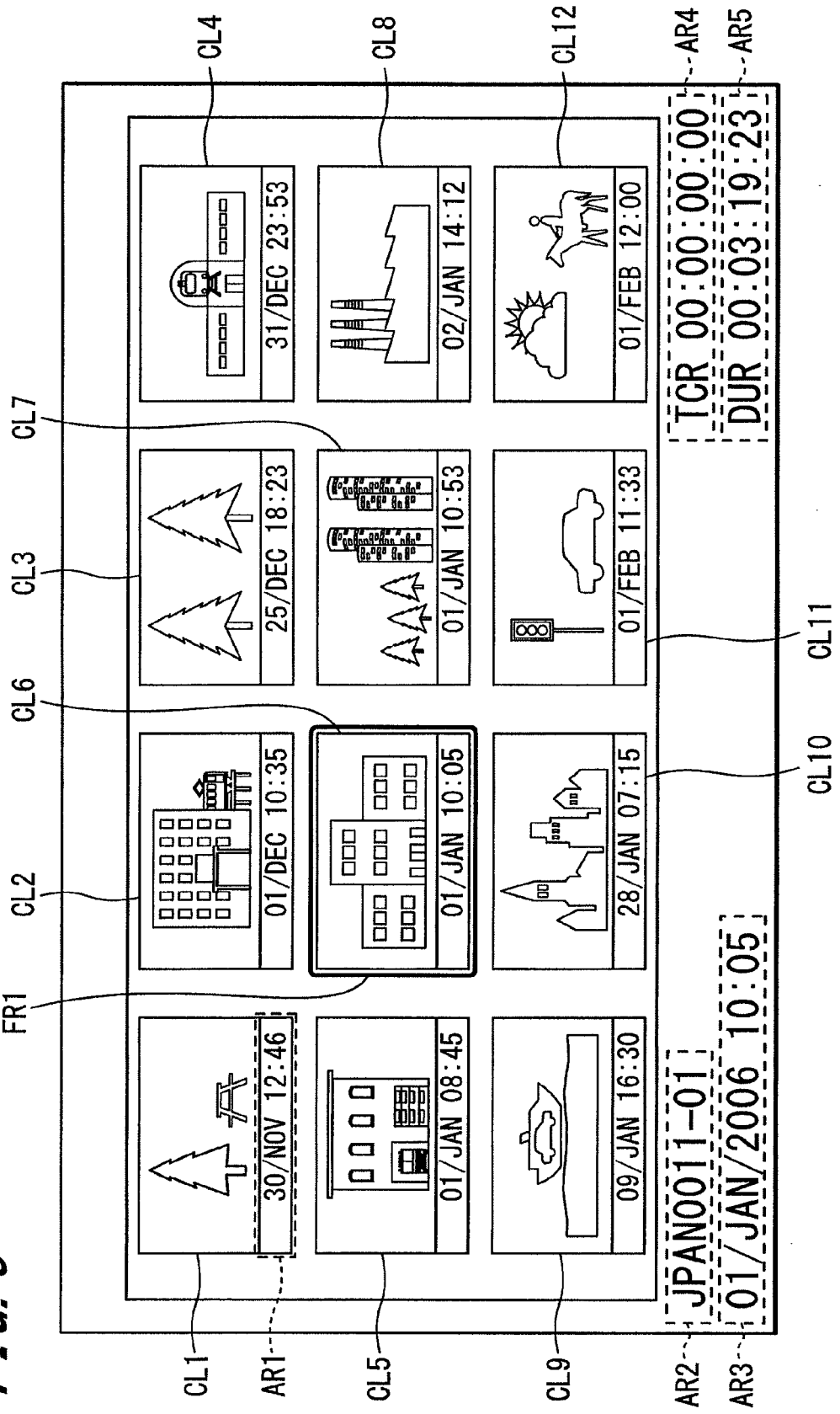
FIG. 6 is a schematic diagram of an exemplified display of a list of thumbnail images according to an embodiment of the invention.

On the thumbnail screen illustrated in FIG. 6, clip CL1 is displayed at the upper left end, followed by the alignment of clip CL2, clip CL3, and so on in this order in the right direction. In this way, 12 clips up to clip CL12 at the right down end are displayed. These clips are disposed in chronological order from old to new recording time and date. The clip with the oldest recording time and date is clip CL1 and the newest clip is clip CL12. AR1 located at the bottom end of each clip represents the recording time and date. For clip CL1, for example, it is shown as "30/NOV12:46". As shown in FIG. 6, furthermore, a selection frame FR1 is displayed in the position of clip CL6 to indicate that clip CL6 is being selected.

More detailed metadata on the selected clip can be displayed in an area below the area where the list of thumbnail images is displayed. Since clip CL6 is selected in FIG. 6, the attribute information of clip CL6 is displayed. The area AR2 represents the name of clip and the area AR3 represents the recording time and date. In addition, the area AR4 represents a time code and the area AR5 represents the recorded length of clip. The clip selection frame FR1 may be moved in the left, right, up, and down directions by the operation of the cross key KY1 (see FIG. 4).

Referring back to the flowchart of FIG. 5, the process will be further described. After displaying a thumbnail screen as shown in FIG. 6 in Step S1, the operation of pushing down the cross key KY1 in any of the left, right, up, and down directions is carried out to position the selection frame FR1 on a desired clip to be subjected to the clip operation and the clip is then selected (Step S2).

A clip-operation menu is displayed when the operation of pushing in the XA of the cross key KY1 while the clip is being selected (Step S3). Then, the cross key KY1 is operated in the up and down directions while the clip-operation menu is being displayed, thereby selecting a desired clip-operation item from the clip-operation menu (Step S4). When the operation of pushing in the XA of the cross key KY1 is performed again while the clip selection item is being selected, the selected clip-operation item is determined (Step S5).

According to the related-art, the operation of pushing in the XA of the cross key coordinates with the playback of a clip, so that the operation of pushing in the XA of the cross key at this state can be resulted in the playback of the selected clip. According to the embodiment of the invention, on the other hand, the operation of pushing in the XA of the cross key KY1 is designed to actuate the clip-operation menu. Details of the clip-operation items will be later described.

Figure 7A:
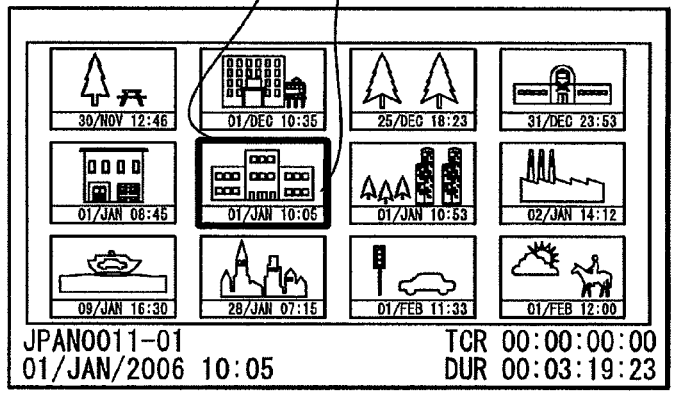
FIGS. 7A to 7E are schematic diagrams showing an exemplified screen transition caused by the operation of a cross key according to an embodiment of the invention, where
Figure 7B:
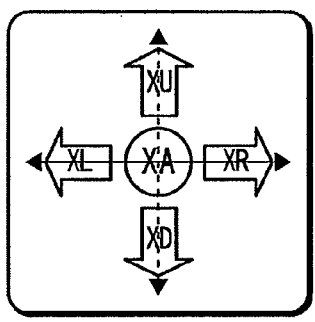

Subsequently, referring to FIGS. 7A to 8D, an example of screen transition caused by the operation of the cross key KY1 will be described. FIGS. 7A to 8D illustrate processing steps until a desired clip is selected and removed. FIG. 7A illustrates a thumbnail screen on which a list of thumbnail images is displayed while the selection frame FR1 is being placed in the position of clip CL6. In this state, as shown in FIG. 7B, the cross key KY1 is pushed down in any of the top (XU), down (XD), left (XL), and right (XR) directions, causing the selection frame FR1 to move over the thumbnail screen simultaneously with the operation.

Figure 7C:
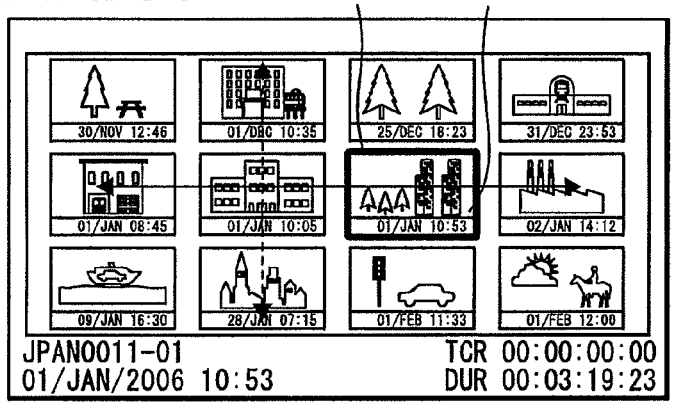
Figure 7D:
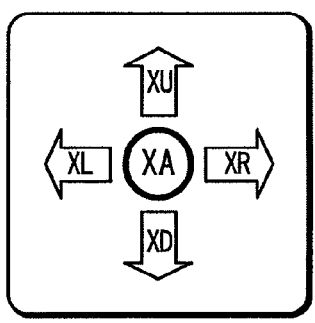
Figure 7E:
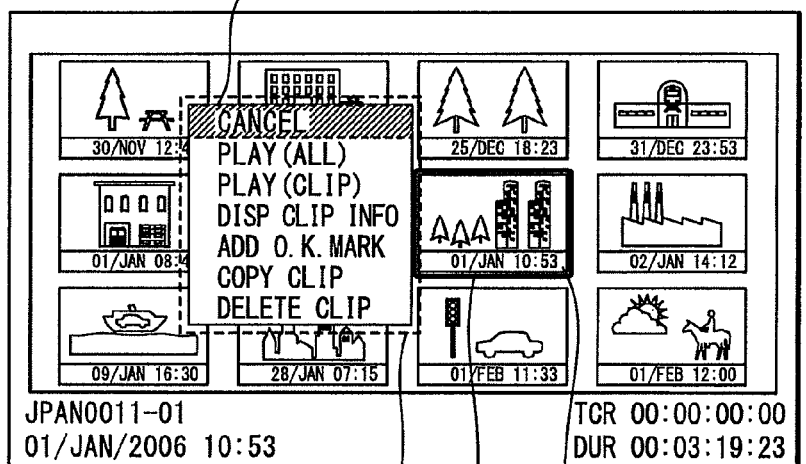

FIG. 7C illustrates that the selection frame FR1 is placed on clip CL7 on the right of clip CL6 to show that clip CL7 is then operated. As illustrated in FIG. 7D, the operation of pushing in the XA of the cross key KY1 is carried out while the selection frame FR1 is being displayed on the clip to be operated. Thus, as illustrated in FIG. 7E, the pop-up of the clip-operation menu MN1 can be displayed. When starting the clip-operation menu MN1, the cursor CS1 points at "CANCEL" located on the highest row in the clip-operation menu MN1 in the example shown in FIG. 7E. In other words, it is designed that "CANCEL" is automatically selected at the time of initiating the clip-operation menu MN1.

Figure 8A:
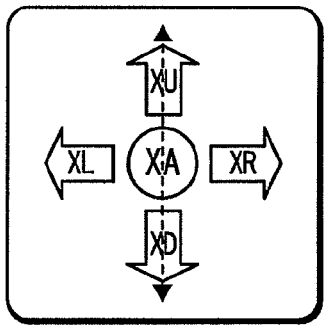
FIGS. 8A to 8D are schematic diagrams showing an exemplified screen transition caused by the operation of a cross key according to an embodiment of the invention, where
Figure 8B:
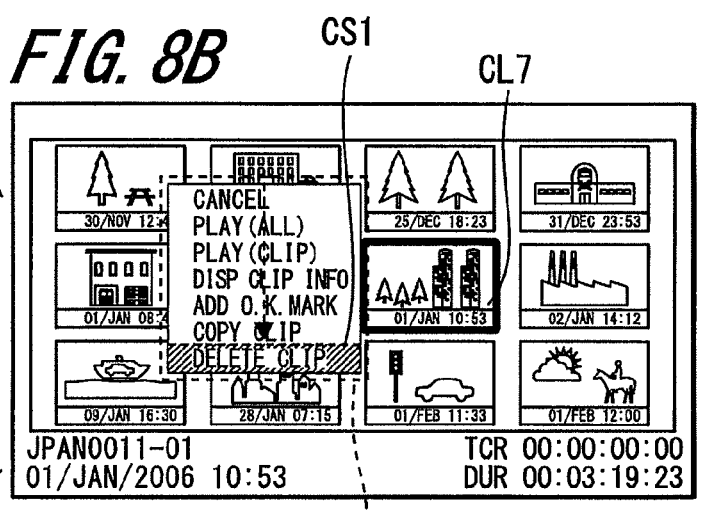

Referring further to FIGS. 8A to 8D, the description will be continued. The cursor CS1 on the clip-operation menu MN1 moves in the up and down directions by the operation of pushing down the cross key KY1 in any of the up (XU) and down (XD) directions as illustrated in FIG. 8A while the clip-operation menu MN1 is being displayed as illustrated in FIG. 7E. Here, the description is carried out on the case of removing clips. Therefore, the operation of pushing down the cross key KY1 is carried out several times so that the cursor C1 can point at "DELETE CLIP" indicated in the lowest row of the clip-operation menu MN1.

Figure 8C:
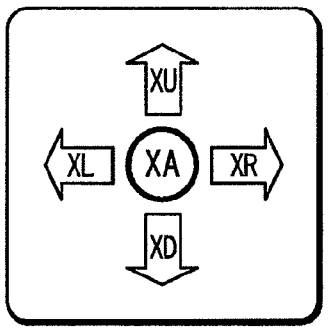
Figure 8D:
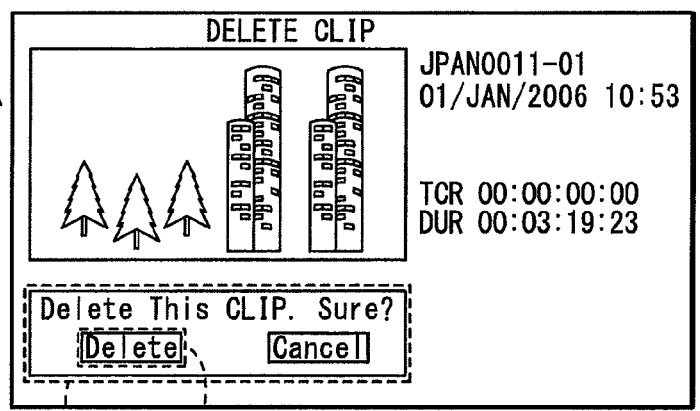

When the operation of pushing in the XA of the cross key KY1 is carried out as illustrated in FIG. 8C while the cursor CS1 points at "DELETE CLIP" (FIG. 8B), the selected clip-operation item ("DELETE CLIP") is confirmed and the screen of clip deletion is displayed as illustrated in FIG. 8D. The clip-deletion screen displays a message in the area AR6 on the lower side of the screen to confirm whether the clip-deleting operation is carried out. Thus, if the clip is desired to be deleted, then the operation of pushing in the XA of the cross key KY1 is again performed after pointing the cursor CS1 at "Delete". By performing such an operation, the desired clip CL7 is deleted from the external recording medium 110.

Next, an example of processing in which each item in the clip-operation menu MN1 is selected will be described with reference to the flow chart of FIG. 9. First, it is determined whether a clip-operation item, which is selected and confirmed by the operation of the cross key KY1 in the up and down directions and the operation of pushing in the XA of the cross key KY1, is "CANCEL" or not (Step S11). If it is "CANCEL", then the actuated clip-operation menu MN1 is closed and then hidden (Step S12).

If the selected clip-operation item is not "CANCEL", then the determination of whether it is "PLAY ALL" or not is carried out (Step S13). If the selected item is "PLAY ALL", then all clips subsequent to the selected clip are played back (Step S14). In other words, playback is initiated from the leading frame of the selected clip. When the playback of the clip is completed, the next clip is then played back. Therefore, the process of playback is carried out to the final frame of the last clip. In the thumbnail screen illustrated in FIGS. 7A, 7C and 7E, for example, when "PLAY ALL" is selected while clip CL6 is being selected, all frames from the clip CL6 to the last clip recorded in the external recording medium 110 are played back.

If the selected clip-operation item is not "PLAY ALL", then the determination of whether it is "PLAY CLIP" or not is carried out (Step S15). If the selected item is "PLAY CLIP", then only the selected clip is played back (Step S16).

If the selected clip-operation item is not "PLAY CLIP", then the determination of whether it is "DISP CLIP INFO" or not is carried out (Step S17). If it is "DISP CLIP INFO", then the metadata of the selected clip is displayed in detail. In addition to the metadata displayed in the area on the lower side of the thumbnail screen of FIG. 6, for example, information about a recording image format, such as "Full HD" or "MPEG-2", and the name of a recording person, ID of recording equipment, and so on are displayed.

If the selected clip-operation item is not "DISP CLIP INFO", then the determination of whether it is "ADD O.K. MARK" or not is carried out (Step S19). If it is "ADD O.K. MARK", then the selected clip is provided with "O.K. clip attribute" (Step S20). "O.K. clip attribute" represents identification information given to any clip based on the operation of a user during video recording or after the recording. The user assigns O.K. clip attributes to clips capturing impact scenes, clips containing scenes that may be desired strongly to use, and so on, respectively. Therefore, it is possible to display these clips as a list when operating and the working efficiency of the operation can be then improved.

If the selected clip-operation item is not "ADD O.K. MARK", then the determination of whether it is "COPY CLIP" or not is carried out (Step S21). If it is "COPY CLIP", then the selected clip is duplicated (Step S22). If the selected clip-operation item is not "COPY CLIP", then the selected clip-operation item is the remaining "DELETE CLIP" and the selected clip is then deleted (Step S24). It should be noted that the order of actual determination process is not limited to one described above.

According to the above-described embodiment, it is possible to carry out the processing from the selection of a desired clip to be operated to an actual operation by the operation of the cross key KY1 alone, so that the operating task can be performed more quickly.

In addition, there may be no need to provide a menu button for actuating the clip-operation menu, so that reduction of a manufacturing cost and miniaturization of the record/playback device 10 can be attained.

Furthermore, when an indicated specific clip is desired to be played back, the embodiment described so far may be configured to carry out the operation of selecting "PLAY ALL" or "PLAY CLIP" from the clip-operation menu MN1 by the operation of the cross key KY1 in the up and down directions while the clip-operation menu MN1 is being displayed. However, the alignment sequence of the clip-operation items is not limited to one described above. It may be configured to omit the procedure of selecting the item of playback from the clip-operation menu MN1 by assigning these items on the top row of the clip-operation menu MN1. A process example of such a case will be described with reference to the flowchart illustrated in FIG. 10.

Figure 10:
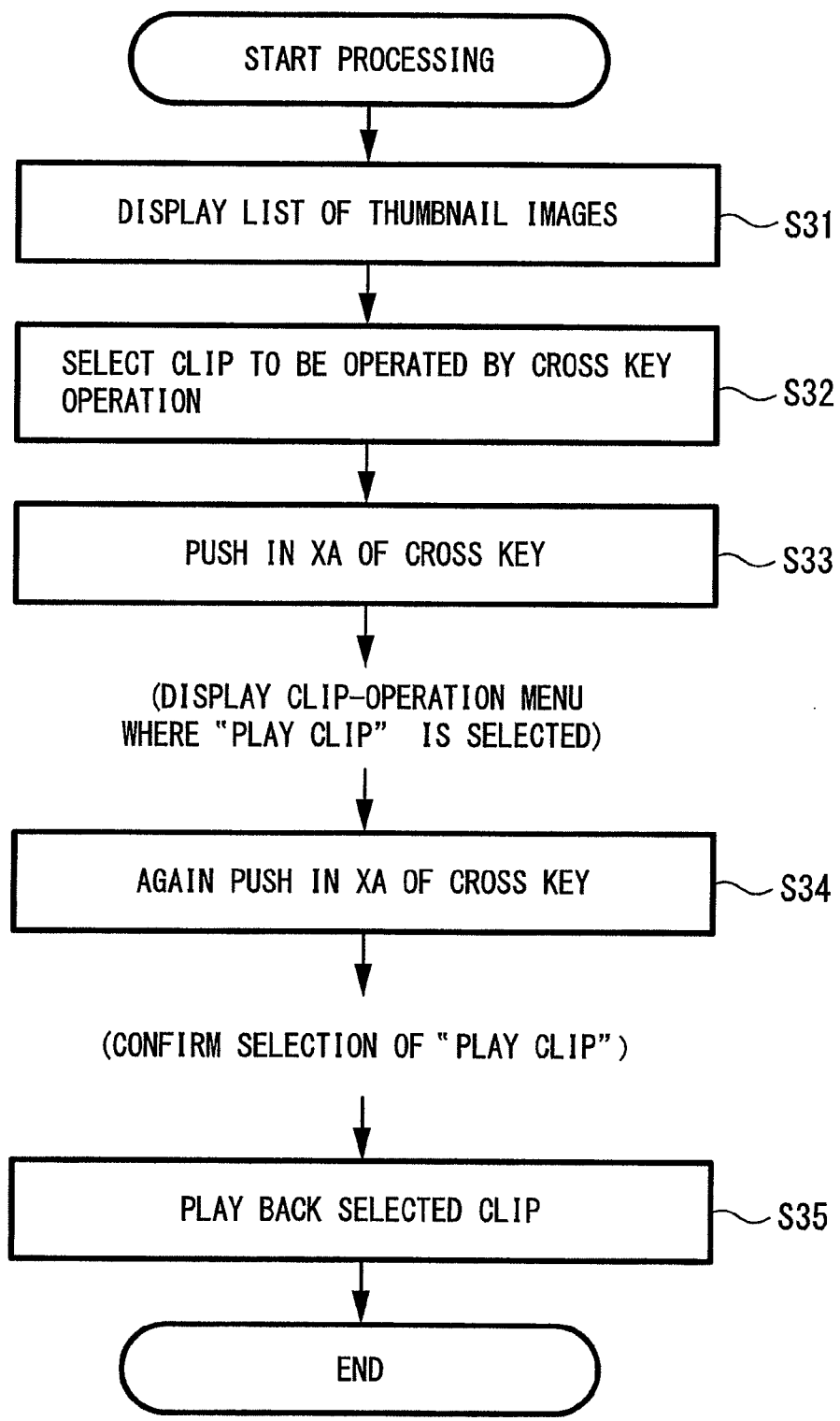
FIG. 10 is a flowchart representing a process example of selecting a clip-operation item according to an embodiment of the invention.

As illustrated in FIG. 10, when the display of a list of thumbnail images is indicated first by pushing down an operation button (not shown) or the like, the list of thumbnail images is displayed on the viewfinder 105 and the display 106 of the record/playback device 10 (Step S31). Subsequently, the cross key KY1 is operated in any of the left, right, up, and down directions to select a desired clip (Step S32) and the operation of pushing in the XA of the cross key KY1 is then performed (Step S33), thereby actuating the clip-operation menu MN1. In the actuated clip-operation menu MN1, the cursor CS1 points at "PLAY CLIP (or PLAY ALL)". Thus, the operation of pushing down the XA of the cross key KY1 is performed again in such a state (Step 34) and then confirms the operation of "PLAY CLIP", so that the selected clip can be played back (Step S35).

Alternatively, the playback of a clip may be performed by the operation of holding down the XA of the cross key KY1 for a while. A process example of such a case will be described with reference to the flowchart of FIG. 11.

Figure 11:
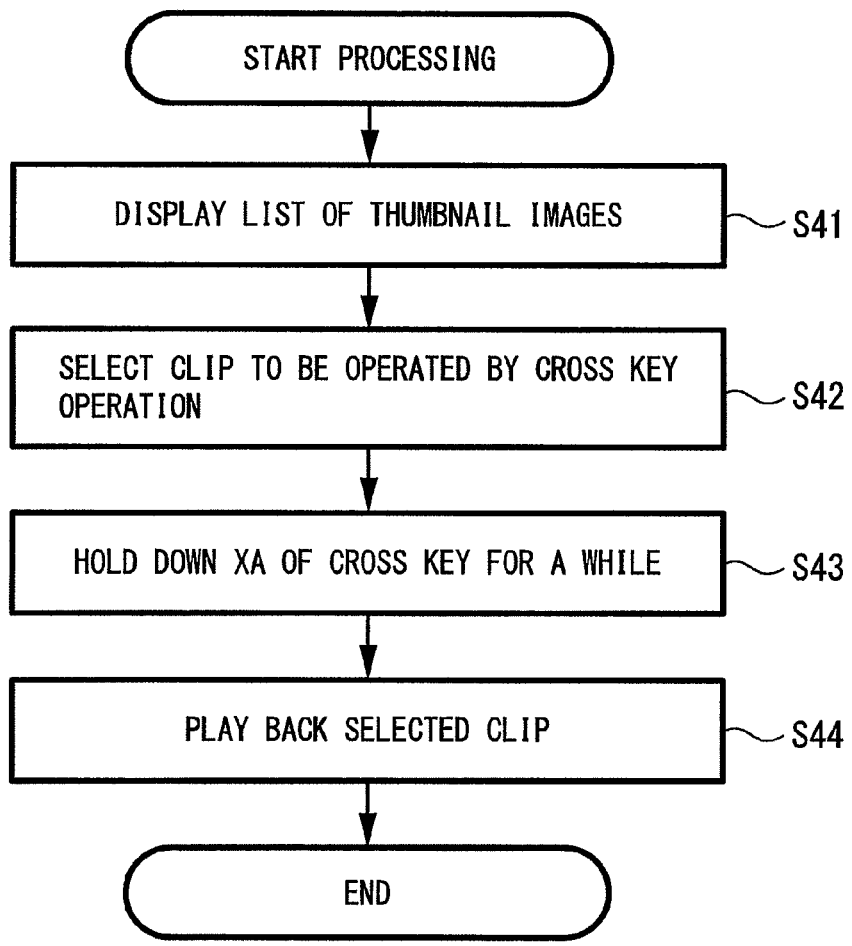
FIG. 11 is a flowchart representing a process example of selecting a clip-operation item according to another embodiment of the invention.

As illustrated in FIG. 11, when the display of a list of thumbnail images is indicated first by pushing down an operation button (not shown) or the like, the list of thumbnail images is displayed on the viewfinder 105 and the display 106 of the record/playback device 10 (Step S41). Subsequently, the cross key KY1 is operated in any of the left, right, up, and down directions to select a desired clip (Step S42). At this stage, when the operation of holding down the XA of the cross key KY1 for a while is performed (Step 43), the selected clip can be played back (Step S44).

With such configuration, operability of the playback operation of a clip can further be improved.

Figure 12:
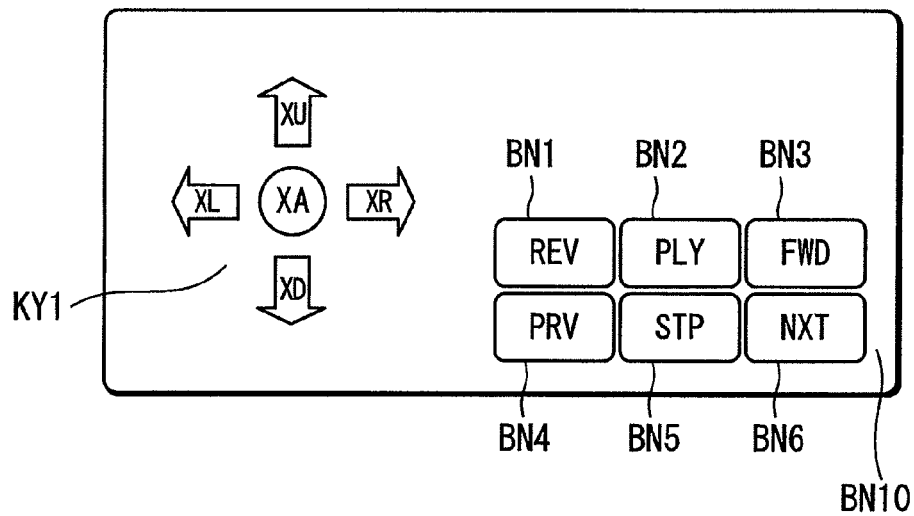
FIG. 12 is a schematic diagram of an exemplified configuration of an operation unit according to another embodiment of the invention.

Furthermore, the cross key KY1 alone has been described in the above-described embodiments. However, as illustrated in FIG. 12, in addition to the cross key KY1, a playback control button group BN10 may be arranged next to the cross key KY1 or anywhere. The playback control button group BN10 may include a REV button BN1, a PLY button BN2, a FWD button BN3, a PRV button BN4, a STP button BN5, and a NXT button BN6. In other words, as shown in the direction from the upper left end to the right in the figure, the REV button BN1 carries out the operation of high-speed playback in the reverse direction. The PLY button BN2 carries out the operation of playback. The FWD button BN3 carries out the operation of high-speed playback in the forward direction. As shown on the left side in the lower row in the figure, the PRV button BN4 is provided for moving to a previous clip. The STP button BN5 is provided for terminating the playback. The NXT button BN6 is provided for moving to a subsequent clip.

In the case of such a configuration, for example, the PLY button BN2 of the playback control button group BN10 may be assigned with the function of "PLAY ALL". In addition, the top row of the clip-operation menu MN1 displayed by the operation of the cross key KY1 may be configured to display "PLAY CLIP". In this case, therefore, the operability of the playback operation can be more improved.

In addition, according to the above-described embodiments, the example not having the menu button BN20 is described. However, the menu button BN20 similar to the related-art example may be provided and the user can select any of two modes. That is, according to one mode, the menu button BN20 is used when the operation of the clip-operation menu is carried out. According to the other mode, the operation is carried out with the cross key KY1 alone without the use of the menu button BN20.

Furthermore, according to the above-described embodiments, the embodiment of the invention has been applied to a record/playback device. Alternatively, an embodiment may be applied to an image capture apparatus used in connection with a video camera, an image capture apparatus, or the like.

Furthermore, according to the above-described embodiments, there is described the example in which the cross key has been used when selecting a desired clip and clip-operation item. However, with the center portion of the key being configured to be pushed in, a key with which the operation is carried out in the restricted directions, for example, in the up and down directions or in the left and right directions can be used. Alternatively, a key may have more than four operation directions. Furthermore, with the above requirements satisfied, the key in any shape, such as a square or a circle, may be applicable.

It should be understood by those skilled in the art that various modifications, combinations, sub-combinations and alterations may occur depending on design requirements and other factors insofar as they are within the scope of the appended claims or the equivalents thereof.

What is claimed is:

1. A record/playback device comprising:
    a recording unit that records an image including one or more frames as one clip and play back the recorded image;
    an operation unit that has a combined operating element including a first operating element for carrying out operation in one or more operation directions and a second operating element for determining details of the operation;
    an interface unit that prepares a list of clips for displaying as a list of thumbnail images representing the list of clips on a thumbnail screen, said list of clips being prepared by collecting specific frames for a predetermined number of clips, where each specific frame is collected from one or more frames constituting each clip recorded in the recording unit; and
    a control unit that
    carries out control of changing a clip to a selected clip operated on the basis of the operation direction of the first operating element when the first operating element is operated, and
    generates a menu-displaying command signal to actuate a pop-up menu which is displayed on the thumbnail screen and superimposed on the list of thumbnail images on an area separate and apart from the selected clip so as not to be overlaid on the selected clip, by operating the second operating element which is operated, in a state in which the actuated pop-up menu is displayed, to confirm a selected item for operating the clip in accordance with an item listed on the actuated pop-up menu,
    wherein the pop-up menu lists items for operating the clip which is indicated by a clip selection frame which is moved over the list of clips displayed on a display screen to a position of the selected clip by operating the first operating element, said first operating element being operated to select one item among the listed items on the actuated pop-up menu for operating the clip.

2. A record/playback device according to claim 1, wherein the specific frame is a leading frame among one or more frames constituting the clip.

3. A record/playback device according to claim 1, wherein the list of thumbnail images represents reduced scale leading frames of the predetermined number of clips.

4. A record/playback device according to claim 1, wherein the control unit that controls playback of the clips operated when the second operating element is depressed while the list of clips prepared in the interface unit is being displayed.

5. A record/playback device according to claim 1, wherein the items for operating the clip include an item for indicating playback of the clip, and the item for indicating playback of the clip is automatically selected when the menu is displayed on the basis of operation of the second operating element.

6. An image capture apparatus comprising:
    an imaging unit that captures an image;
    a recording unit that records images captured within a period from the start to the end of shooting at the imaging unit as one clip and to play back the recorded images;
    an operation unit that has a combined operating element including a first operating element for carrying out operation in one or more operation directions and a second operating element for determining details of the operation;
    an interface unit that prepares a list of clips for displaying as a list of thumbnail images representing the list of clips on a thumbnail screen, said list of clips being prepared by collecting specific frames for a predetermined number of clips, where each specific frame is collected from one or more frames constituting each clip recorded in the recording unit; and
    a control unit that
    carries out control of changing a clip to a selected clip operated on the basis of the operation direction of the first operating element when the first operating element is operated, and
    generates a menu-displaying command signal to actuate a pop-up menu which is displayed on the thumbnail screen and superimposed on the list of thumbnail images on an area separate and apart from the selected clip so as not to be overlaid on the selected clip, by operating the second operating element which is operated, in a state in which the actuated pop-up menu is displayed, to confirm a selected item for operating the clip in accordance with an item listed on the actuated pop-up menu,
    wherein the pop-up menu lists items for operating the clip which is indicated by a clip selection frame which is moved over the list of clips displayed on a display screen to a position of the selected clip by operating the first operating element, said first operating element being operated to select one item among the listed items on the actuated pop-up menu for operating the clip.

7. A menu-operating method, in a record/playback device including a recording unit that records an image having one or more frames as one clip, of operating a menu in which items for operating the clip is described comprising the steps of:
- preparing a list of clips for displaying as a list of thumbnail images representing the list of clips on a thumbnail screen, said list of clips being prepared by collecting specific frames for a predetermined number of clips from one or more frames that constitute each clip recorded in the recording unit;
- selecting the clip by operating a first operating element that carries out operation in one or more operation directions; and
- generating a menu-displaying command signal for actuating a pop-up menu which is displayed on the thumbnail screen and superimposed on the list of thumbnail images on an area separate and apart from the selected clip so as not to be overlaid on the selected clip, by operating the second operating element which is operated, in a state in which the actuated pop-up menu is displayed, to confirm a selected item for operating the clip in accordance with an item listed on the actuated pop-up menu,
- wherein the pop-up menu lists items for operating the clip said first operating element being indicated by a clip selection frame which is moved over the list of clips displayed on a display screen to a position of the selected clip by operating the first operating element, said first operating element being operated to select one item among the listed items on the actuated pop-up menu for operating the clip.

* * * * *